Oct. 20, 1925.
W. L. WHIDDEN ET AL
1,557,952
BATTERY
Filed Aug. 13, 1923
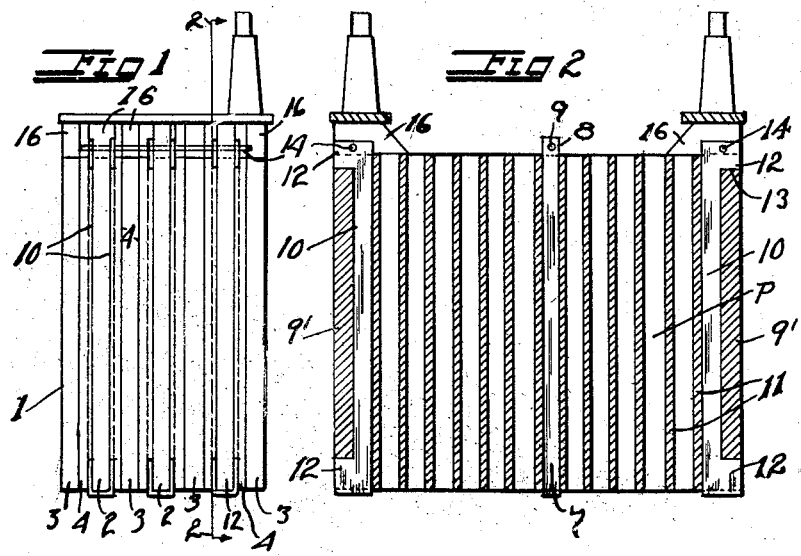
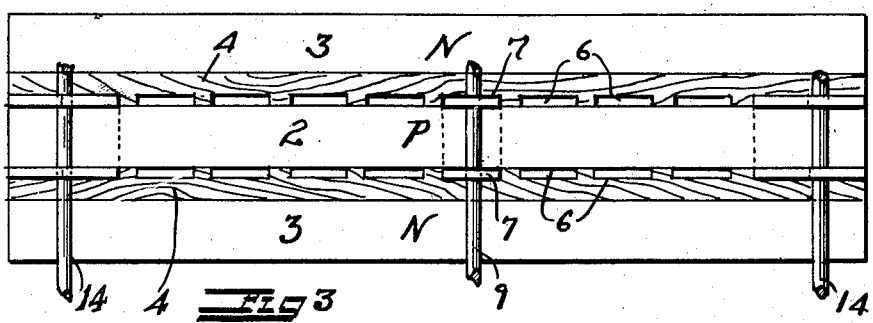
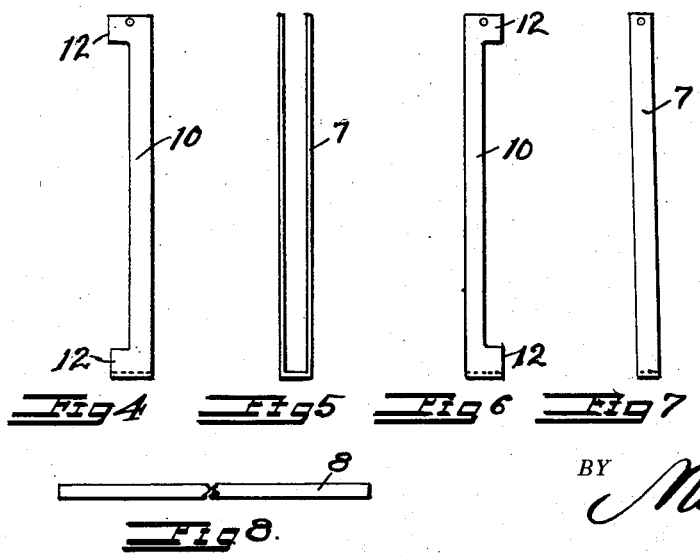
INVENTORS
W L. Whidden
L. M⁰ Cartney
BY
ATTORNEYS Patented Oct. 20, 1925.

1,557,952

UNITED STATES PATENT OFFICE.

WILLIAM L. WHIDDEN AND LORENZO McCARTNEY, OF MORGAN HILL, CALIFORNIA.

BATTERY.

Application filed August 13, 1923. Serial No. 656,992.

*To all whom it may concern:*

Be it known that we, WILLIAM L. WHIDDEN and LORENZO McCARTNEY, citizens of the United States, and residents of Morgan Hill, county of Santa Clara, State of California, have invented a new and useful Battery, of which the following is a specification.

The present invention relates to improvements in batteries and its particular object is to provide improved insulating and reinforcing means for the positive plates of the battery. Our improvement is particularly intended to be used in batteries in which wood separators are interposed between the positive and the negative plates while sheets of hard rubber are introduced between the wood separators and the plates of the battery. In the battery we have in mind, the wood separators are provided with a plurality of vertical grooves facing the positive plate and the hard rubber insulating plates are perforated to allow of the free circulation of the electrolyte. These hard rubber insulators take up considerable space in the battery and also reduce the amount of active material on the positive plate to be exposed and it is proposed in the present invention to provide a substitute for these hard rubber plates that will take up no additional space whatever, being designed to lie in the grooves of the wood separators. It is further proposed to construct these hard rubber insulators in such a manner that they will cover very little of the positive plate and therefore do not reduce the active material exposed to nearly the degree as the hard rubber plates. Our means is simple, can be made at little expense, will cheapen the manufacture of batteries, allow of heavier plates for the same space, and will prevent buckling of the plates and short-circuiting to the same degree as the perforated plates now being used.

The preferred form of our invention is illustrated in the accompanying drawing, in which Figure 1 shows an end view arrangement of a plurality of positive and negative plates arranged according to our invention, Figure 2 a vertical section taken along the line 2—2 of Figure 1, Figure 3 an enlarged top plan view illustrating the arrangement of a positive plate with a negative plate on either side, Figure 4 a detail view of one insulating member used on the left hand side of the battery, Figure 5 a detail view of an insulating member used in the central portion of the battery, Figure 6 a detail view of an insulating member used on the right hand side of the battery, Figure 7 a side view of the member shown in Figure 5, and Figure 8 a detail view of a holding pin used in our device. While we have shown only the preferred form of our invention, it should be understood that various changes or modifications may be made within the scope of the claims hereto attached without departing from the spirit of the invention.

The battery (1) consists of a plurality of positive and negative plates (2) and (3) and wood separators (4) interposed between the same. The wood separators are provided with a plurality of vertical grooves (6) which latter face the positive plates so that the smooth side of each wood separator is placed against a negative plate.

Our invention consists principally in the U-shaped insulating strips (7) straddling the positive plate so as to surround the sides and the bottom thereof and extending above the plate as shown at (8) so as to allow a pin (9) to be passed through a plurality of strips straddling different plates to combine the same into one unit and to prevent strips from dropping downwardly. The strips which may be made of any suitable insulating material are of the same width as the grooves in the adjacent wood separators so that the strip if placed in the proper position will disappear in the groove and will not take up any space except such as is taken up by the groove anyhow.

The number of strips thus used may vary but we prefer to use three strips, one occupying a central position and one being provided near each edge. The central strip is just plain, as shown in Figure 2 and in Figures 5 and 7. The end strips (10) are of slightly different form to increase their usefulness. It will be noted from Figure 2 that the end grooves are disposed a certain distance away from the edge of the wood separators so as to leave ribs (9') of larger width than the ribs (11) interposed between the grooves. Our strips fitting the end grooves are provided at the top and at the bottom with outwardly extending projections (12) which are of sufficient length to extend to the edge of the wood separator and be flush with the same. To allow these projections to lie in the plane of the grooves of the wood separator the upper and lower portions of the ribs (9′) are cut away in the manner shown at (13). The end strips (10) also extend slightly above the wood separators and the plates so that pins (14) may be passed through the same, which latter will also pass through the plate lugs (16) and thereby tend to bind all the elements into one firm unit. It will be understood, of course, that the pins (8) and the pins (12) are made of insulating material so as to avoid any short circuits.

The advantages to be realized from this construction will be readily understood. The U-shaped insulating members perform all the functions of the insulating plates previously used without taking up any space in the battery. They interfere to a much less degree with the chemical action taking place in the battery and allow more surface to be exposed. They allow thicker plates to be used for the same size of battery, whereby the capacity of the battery is increased and a longer life insured. Engaging the four corners of the positive plate and protecting the lateral edges as well as the central strip, they are an effective means of preventing buckling and short circuiting of the plates.

We claim:

1. In a battery having a positive plate, a negative plate and a grooved wood separator interposed between the same with the grooves facing one of the plates, an insulating strip adapted to receive an edge of the positive plate and lying in a groove of the adjacent wood separator.

2. In a battery having a positive plate, negative plates on opposite sides of the same and grooved wood separators interposed between the positive and negative plates with the grooves facing the positive plate, a U-shaped insulating strip engaging the positive plate on both sides thereof and lying in registering grooves of the adjacent wood separators.

3. In a battery having a positive plate, negative plates on opposite sides thereof and wood insulators interposed between the positive and negative plates having vertical grooves facing the positive plate, two U-shaped insulating strips straddling marginal portions of the plate on opposite sides thereof and an intermediate U-shaped strip similarly straddling an intermediate portion of the positive plate, with all the strips lying in registering grooves of the adjacent wood separators.

4. In a battery having a positive plate, negative plates on opposite sides thereof and wood insulators interposed between the positive and negative plates having vertical grooves facing the positive plate, two U-shaped insulating strips straddling marginal portions of the plate on opposite sides thereof and an intermediate U-shaped strip similarly straddling an intermediate portion of the positive plate, with all the strips lying in registering grooves of the adjacent wood separators, and the marginal strips being provided with upper and lower projections extending to the edges of the positive plate for reinforcing the same.

5. In a battery having a positive plate, negative plates on opposite sides of the same and grooved wood separators interposed between the positive and negative plates with the grooves facing the positive plate, a U-shaped insulating strip contacting the bottom and the sides of the positive plate and extending above the same being made to lie in registering grooves of the adjacent wood separator, and a pin extending through the extension above the positive plate for preventing the strip from dropping.

6. In a battery having a plurality of positive plates having registering lugs extending upwardly, a plurality of negative plates disposed in alternating relation with the positive plates having registering lugs extending upwardly and wood separators interposed between the positive and negative plates having vertical grooves facing the positive plates, U-shaped insulating strips straddling the positive plates from the bottom thereof and lying in the grooves of the wood separators and pins extending through the tops thereof and the lugs for preventing the strips from dropping.

7. In a battery having a plurality of positive plates, a plurality of negative plates disposed in alternating relation with the positive plates, and wood separators interposed between the positive and negative plates, having vertical grooves facing the positive plates, U-shaped insulating strips straddling the positive plates and lying in the grooves of the wood separators and extending throughout the length thereof.

8. In a battery having a plurality of positive plates, a plurality of negative plates disposed in alternating relation with the positive plates and wood separators interposed between the positive and negative plates having vertical grooves facing the positive plates, insulating members straddling the positive plates and lying in the grooves of the wood separators.

WILLIAM L. WHIDDEN.
LORENZO McCARTNEY.